United States Patent [19]

Sueyoshi et al.

[11] Patent Number: 4,956,220
[45] Date of Patent: Sep. 11, 1990

[54] MAGNETIC RECORDING MEDIUM

[75] Inventors: Toshinobu Sueyoshi, Kyoto; Seiichi Asada, Osaka; Masahiro Amemiya, Takatsuki; Seigi Kawarai, Ashiyashi; Akira Miyake, Kyoto, all of Japan

[73] Assignee: Hitachi Maxell, Ltd., Osaka, Japan

[21] Appl. No.: 28,570

[22] Filed: Mar. 20, 1987

[30] Foreign Application Priority Data

Mar. 20, 1986 [JP] Japan .................................. 61-63169
Oct. 4, 1986 [JP] Japan ................................. 61-236664

[51] Int. Cl.$^5$ .............................................. G11B 23/00
[52] U.S. Cl. ................................... 428/141; 252/62.51; 428/328; 428/329; 428/403; 428/404; 428/694; 428/900
[58] Field of Search ............... 428/328, 329, 331, 695, 428/404, 694, 900, 654; 252/62.58, 62.59, 62.54, 62.51

[56] References Cited

U.S. PATENT DOCUMENTS

| | | | |
|---|---|---|---|
| 3,736,181 | 5/1973 | Pye | 428/404 |
| 3,814,598 | 6/1974 | Gabriel | 428/928 |
| 4,043,846 | 8/1977 | Amemiya | 252/62.59 |
| 4,169,802 | 10/1979 | Basile | 428/404 |
| 4,255,492 | 3/1981 | Audran | 428/900 |
| 4,336,310 | 6/1982 | Okuyama | 428/900 |
| 4,390,361 | 6/1983 | Sueyoshi | 428/404 |
| 4,400,432 | 8/1983 | Buxbaum | 428/329 |
| 4,404,254 | 9/1983 | Franz | 428/329 |

FOREIGN PATENT DOCUMENTS 1022604 1/1986 Japan .................................. 428/404

Primary Examiner—Paul J. Thibodeau
Attorney, Agent, or Firm—Birch, Stewart, Kolasch & Birch

[57] ABSTRACT

A magnetic recording medium with improved output characteristics and durability is provided by using magnetic powder comprising iron-containing particles each of which carries a compound containing aluminum and/or a compound containing silicon in such amounts that, in the whole magnetic powder, a weight ratio of silicon to iron is from 0.010:1 to 0.150:1, a weight ratio of aluminum to iron is from 0.040:1 to 0.150:1, and a weight ratio of aluminum to silicon is from 1:1 to 15:1.

8 Claims, 1 Drawing Sheet

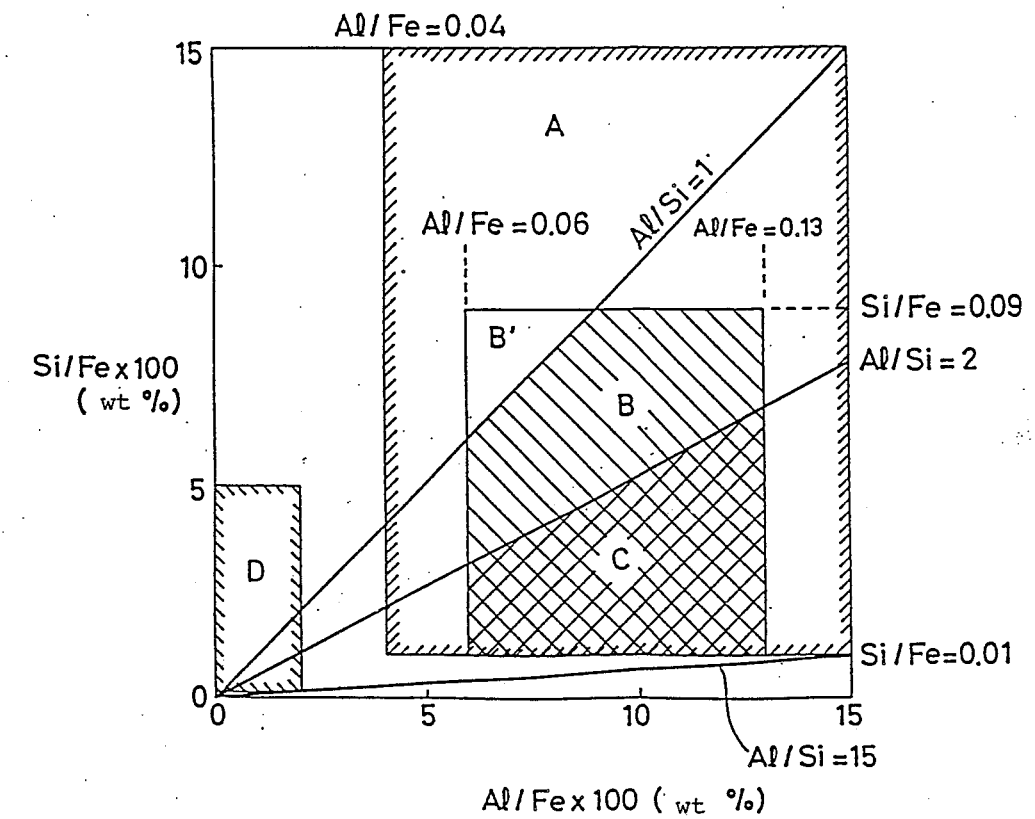
Fig.

MAGNETIC RECORDING MEDIUM

BACKGROUND OF THE INVENTION

1. Field of the Invention

The present invention relates to a magnetic recording medium such as a magnetic tape and magnetic disc.

2. Description of the Prior Art

A coating type magnetic recording medium, which comprises a substrate and a magnetic layer formed on a substrate by applying a magnetic paint on the substrate followed by drying, is widely used since it has a good handling property and mass productivity so that it is suitable for production on an industrial scale.

For improving recording characteristics of the coating type magnetic recording medium, various proposals have been made to add a larger amount of magnetic powder as a magnetic recording element to the magnetic layer, or to more homogeneously disperse the magnetic powder in the magnetic layer. As a result, output characteristics, particularly electromagnetic conversion characteristics have been improved.

During the use of a video tape or a floppy disc, however, the homogeneously contained magnetic powder in a large amount in the magnetic layer is scraped off from the surface by a magnetic head with which the magnetic layer is slidingly in contact, whereby the output characteristics and the electromagnetic conversion characteristics are deteriorated.

To prevent the scraping of the magnetic powder, abrasion particles having greater hardness than the magnetic head and the magnetic powder are added to the magnetic layer and, if desired, a liquid lubricant is additionally used. Such techniques are disclosed in Japanese Patent Publication Nos. 18572/1973, 15003/1973, 28642/1977, 49961/1977, 15771/1980, 24171/1980 and 51171/1982 and Japanese Patent Kokai Publication (unexamined) Nos. 466/1972, 56404/1973, 115510/1974, 62604/1975, 92101/1975, 93405/1975, 147308/1975, 31201/1976, 45309/1977, 75410/1977, 88307/1977, 97709/1977, 97710/1977, 16605/1978, 47806/1978, 134407/1978, 21805/1979, 103005/1979, 143608/1979, 1638/1980, 17811/1980, 17813/1980, 17814/1980, 17835/1980, 129935/1980, 150131/1982, 159236/1983 and 144036/1984.

However, the addition of the non-magnetic materials, such as the abrasive and the lubricant which do not contribute to magnetic recording, to the magnetic layer not only decreases the volume ratio of the contained magnetic powder in the magnetic layer, but also makes it difficult to homogeneously disperse both the magnetic powder and the nonmagnetic materials. That is, when the magnetic powder alone is dispersed in a binder resin of the magnetic layer, only the dispersibility of the magnetic powder is taken into consideration. When the non-magnetic materials, for example, the abrasive particles are used, they should be dispersed in the binder resin in addition to the magnetic powder. In such a case, when a mixing ratio of the magnetic powder and the non-magnetic materials is kept constant in the magnetic layer, the magnetic characteristics become non-uniform in the magnetic layer and in turn the output characteristics fluctuate.

Therefore, recently it is desired to provide another way to achieve both good output characteristics and durability of the magnetic recording medium at a high level.

SUMMARY OF THE INVENTION

One object of the present invention is to provide a magnetic recording medium which has good electromagnetic conversion characteristics and simultaneously can solve various problems caused by sliding contact of the magnetic recording medium with a magnetic head.

Another object of the present invention is to provide a magnetic recording medium comprising a magnetic layer containing magnetic powder which achieves good electromagnetic conversion characteristics and improves the durability of the medium even in the absence of the non-magnetic materials, particularly the non-magnetic solid materials, such as the abrasive.

These and other objects of the present invention are achieved by a magnetic recording medium comprising a substrate and a magnetic layer which is formed on the substrate and contains a magnetic powder comprising iron, each particle of which carries a compound containing aluminum and/or a compound containing silicon in such amounts that, in the whole magnetic powder, a weight ratio of aluminum to iron is from 0.010:1 to 0.150:1 and a weight ratio of silicon to iron is from 0.040:1 to 0.150:1.

BRIEF DESCRIPTION OF THE DRAWING

The accompanying FIGURE is a graph showing the weight ratios of silicon to iron and aluminum to iron of the magnetic powder of the present invention.

DETAILED DESCRIPTION OF THE INVENTION

The magnetic powder consisting of particles surfaces covered with an aluminum-containing compound is disclosed in Japanese Patent Kokai Publication Nos. 122213/1977 and 134858/1977, and the magnetic powder consisting of particle surfaces covered with a silicon-containing compound is disclosed in Japanese Patent Kokai Publication Nos. 30758/1977 and 134858/1977. When the former is used alone, a magnetic recording medium has poor output characteristics although its durability is good, while when the latter is used alone, a magnetic recording medium has poor durability although its output characteristic is good.

According to the present invention, when the aluminum-containing compound or the silicon-containing compound is provided in the form of an abrasive instead of the coating on the magnetic powder particles, for example, when a mixture of the magnetic powder consisting of particle surfaces covered with the silicon-containing compound and $Al_2O_3$ powder is used, the magnetic recording medium produced has unsatisfactory output characteristics and durability.

When magnetic powder particles covered with both the aluminum-containing compound and the silicon-containing compound, as disclosed in Japanese Patent Publication No. 19168/1974 are used alone, a recording medium produced has good output characteristics and durability insofar as the aluminum-containing compound and the silicon-containing compound are used in a certain specific ratio.

It has been found that, to produce a magnetic recording medium which satisfies both output characteristics and durability, it is desirable for aluminum and silicon to be present on the surfaces of the magnetic powder particles in a certain ratio in the form of an aluminum-containing compound and a silicon-containing compound rather than being contained in the magnetic layer as abrasives in the form of Al$_2$O$_3$ or SiO$_2$, independently. The reasons for this have not been known but are hypothesized as follows:

(i) When the output characteristics are improved by homogeneously dispersing the magnetic powder in the magnetic layer, the aluminum-containing compound and the silicon-containing compound carried on the surface of the magnetic powder particles are also homogeneously dispersed in the magnetic layer. Therefore, suitable amounts of these compounds can be exposed to the surface of the magnetic layer so that uniform contact between the magnetic recording medium and the magnetic head can be achieved.

(ii) In comparison with a case where the Al$_2$O$_3$ particles and the SiO$_2$ particles are used together with the conventional magnetic powder, an abrasion effect is achieved by a smaller volume of aluminum and silicon in the magnetic layer. Therefore, the content of the magnetic powder in the magnetic layer can be increased.

(iii) When the abrasives containing aluminum and/or silicon are contained in the magnetic layer together with the conventional magnetic powder with insufficient dispersion of the abrasives, magnetization strength of the magnetic layer becomes un-uniform, whereby the output characteristics are considerably deteriorated. In an extreme case, agglomerates of the undispersed abrasive particles are exposed on the surface of the magnetic layer and, in turn, the surface smoothness of the magnetic layer is greatly deteriorated. However, according to the present invention, such defects are hardly found.

(iv) Since both the aluminum-containing compound and the silicon-containing compound have good affinity with the binder resin, their combination keeps the properties of the magnetic surface uniform.

(v) Since the aluminum-containing material, such as Al$_2$O$_3$ is homogeneously dispersed by a function of silicon which has strong affinity with said material and silicon having good affinity with a material of the magnetic head is homogeneously dispersed in the surface layer of the magnetic layer, the magnetic recording medium is not adversely affected by the sliding contact with the magnetic head.

It should be noted that the magnetic recording medium which satisfies both the output characteristics and required durability is produced only when the aluminum-containing compound and the silicon-containing compound are contained in a certain specific amount range If one of them is contained in an amount outside this range, at least one of the output characteristics or durability is deteriorated. For example, Japanese Patent Kokai Publication (unexamined) No. 5901/1981 discloses magnetic powder particles, the surface of which are covered with the aluminum-containing compound and the silicon-containing compound. In these magnetic powder particles, aluminum is contained in an Al/Fe weight ratio of $10^5$:1 to 0.02:1 and silicon is contained in a Si/Fe weight ratio of 0.002:1 to 0.05:1. That is, the adhered amounts of the aluminum and silicon components are in the domain D in the FIGURE. It was found that the magnetic recording medium containing such magnetic powder particles does not have satisfactory output characteristics and durability.

According to the present invention, the Al/Fe weight ratio is in the range of 0.040:1 to 0.150:1, and the Si/Fe weight ratio is in the range of 0.010:1 to 0.150:1, which are in the domain A in the FIGURE.

When the weight ratio of aluminum to iron is larger than the above range, not only the electromagnetic conversion characteristics are deteriorated but also the magnetic head is vigorously abraded by the sliding contact between the head and the magnetic recording medium. When it is smaller than the above range, the desired effects of the present invention are not achieved. When the weight ratio of silicon to iron is larger than the above range, the electromagnetic conversion characteristics are considerably deteriorated. When it is smaller than the above range, the desired effects of the present invention are not achieved.

The preferred weight ratio of aluminum to iron is from 0.060:1 to 0.130:1, and the preferred weight ratio of silicon to iron is from 0.010:1 to 0.090:1, which are in the domains B, B' and C.

A weight ratio of aluminum to silicon (Al/Si) is preferably from 1:1 to 15:1. When the content of aluminum is too large in comparison with that of silicon, the magnetic head is extremely abrased by the sliding contact between the head and the magnetic recording medium. When the content of silicon is too large in comparison with that of aluminum, the electromagnetic conversion characteristics are deteriorated. Therefore, more preferably, the contents of aluminum and silicon are below the line corresponding to Al/Si=1, namely in the domains B and C. Particularly preferred ratio of Al/Si is from 2:1 to 15:1. Therefore, the most preferred contents of aluminum and silicon are in the domain C in the FIGURE.

The output characteristics and durability of the magnetic recording medium are improved particularly when the content of the magnetic powder in the magnetic layer is not less than 15% by volume.

Specific examples of the magnetic powder comprising iron are $\gamma$-Fe$_2$O$_3$, Fe$_3$O$_4$, an intermediate iron oxide of $\gamma$-Fe$_2$O$_3$ and Fe$_3$O$_4$, cobalt-containing $\gamma$-Fe$_2$O$_3$, cobalt-containing Fe$_3$O$_4$, a cobalt containing intermediate iron oxide of $\gamma$-Fe$_2$O$_3$ and Fe$_3$O$_4$, iron nitride, an alloy comprising iron, cobalt and nickel, and barium ferrite which may be modified with titanium or cobalt.

The present invention is particularly effective when the magnetic powder consists of such a metal or alloy that is soft and easily corroded by moisture and/or oxygen in the air. This is, the aluminum or silicon-containing compound on the surfaces of the magnetic powder particles acts as a protective layer against oxidation and the like. The magnetic recording medium containing the metal oxide type magnetic powder is more widely used than the metal type magnetic powder and is expected to be used under severer conditions. When the present invention is applied to such a magnetic recording medium, it is possible to improve the desirable properties of the metal oxide type magnetic powder so that the magnetic recording medium can be used in wide ranges of temperature and humidity.

The magnetic particle to be used according to the present invention may be of any shape such as granule, spherical, acicular, plate or ellipsoid. Particularly preferred is a magnetic powder having a particle shape which is easily orientated in parallel with the surface of the substrate by shear force during application of the magnetic paint. Examples of such easily orientated magnetic powder are those having an acicular particle shape or a plate-like particle shape. This is because the larger surface area of such a particle is in parallel with the surface of the magnetic layer contacting the magnetic head, namely in the running direction of the magnetic recording medium, and therefore the aluminum or silicon-containing compound can be effectively placed near the surface of the magnetic layer Further, the easily orientated magnetic powder can be contained in a higher volume content in the magnetic layer.

Preferably, an average major axis of the acicular or granular magnetic powder particle and an average diameter of the plate-like magnetic powder particle is from 0.01 to 1 $\mu$m. An average aspect ratio (average major axis/average minor) of the acicular magnetic powder particle is preferably from 3/1 to 20/1. An average plate ratio (average diameter/average thickness) is preferably from 2/1 to 30/1.

According to the present invention, the surface smoothness of the magnetic layer is improved. A center line average height of the surface of the magnetic layer can be reduced to 0.01 $\mu$m or less according to the present invention. This is partly because the aluminum or silicon-containing compound is carried on the surface of the magnetic powder particles which are homogeneously dispersed in the magnetic layer instead of placing the abrasive particles on the surface of the magnetic powder particles, so that it is possible to avoid adverse influence of the extruding particles, and partly because the aluminum or silicon-containing compound can be effectively contained in the magnetic layer particularly when the magnetic powder particles have the easily orientated shape.

The magnetic particles surfaces which are covered with the aluminum or silicon-containing compound may be prepared by contacting the magnetic powder particles with gas comprising such compound, or by dipping the particles in a solution containing such compound Further, in case of the metal type magnetic powder prepared by reduction of goethite, treatment with the aluminum or silicon-containing compound may be carried out during formation or post-treatment of goethite followed by reduction of the treated goethite to form the magnetic powder The aluminum or silicon-containing compound is usually an oxide or water-containing oxide of aluminum or silicon, which has best effects among the aluminum or silicon compounds. Alternatively, an organic compound containing aluminum or silicon (e.g. aluminum isopropoxide, tetramethoxysilane, and silicone oil) may be used according to the present invention.

When a two-layer coating of the aluminum-containing compound and the silicon-containing compound is formed on the surfaces of the magnetic powder particles, the sequence of two layers is arbitrary. Preferably, the aluminum-containing compound forms the upper layer, whereby the durability of the magnetic recording medium is greatly improved. The reasons for this are that, the layer of the silicon-containing compound has good adherence with both the surface of the magnetic powder particle and the layer of the aluminum-containing compound, and the aluminum-containing compound, which is harder than the silicon-containing compound, forms the outer surface of the magnetic powder particle so that the surface of the magnetic powder particle becomes harder.

The magnetic particles, the surfaces of which are covered with the coating having large surface hardness firmly adhered to the surfaces, can impart good abrasion effect to the magnetic layer and make the magnetic layer more tough, so that wear or breaking of the magnetic powder particles, due to sliding contact of the magnetic layer with the magnetic head, is effectively prevented and removal of the magnetic powder and drop out of the recorded signals are avoided. Thus, the durability of the magnetic recording medium is satisfactorily improved.

Since the layer of the aluminum-containing compound formed on the surface of the magnetic particle has good affinity with the binder resin and is firmly bonded to the binder resin through functional groups, such as hydroxyl groups, the dispersibility of the magnetic powder in the binder resin is improved and, therefore, the magnetic recording medium containing such magnetic powder has improved output characteristics.

Aluminum atoms and silicon atoms are carried by the whole magnetic powder, namely statistically carried by the magnetic powder. That is, the magnetic powder may retain both the aluminum-containing compound and the silicon-containing compound on the surface of one particle, or the magnetic powder may be a mixture of particles the surfaces of which are covered with the aluminum-containing compound in the one instance and the silicon-containing compound in the other. When the magnetic recording medium is produced by using the former magnetic powder, non-uniformity of the durability over the surface of the magnetic recording medium is decreased since the aluminum-containing compound and the silicon-containing compound are homogeneously present on the surfaces of the magnetic powder particles. When the latter mixture type magnetic powder is used, the electromagnetic conversion characteristics of the magnetic recording medium are also excellent since the number of steps for coating different kinds of atoms over the surfaces of the magnetic particles can be reduced, preferably to only one step.

The aluminum-containing compound and the silicon-containing compound can be formed either by a vapor deposition method or a liquid coating method or by a method similar to those disclosed in the above described patent publications. Both compounds may be applied by the same method or by different methods.

The magnetic particles, the surfaces of which are covered with the aluminum-containing compound and the silicon-containing compound are mixed with and dispersed in a thermoplastic binder resin having a softening point of 140° C. or lower, a polymerization degree of about 200 to 2,000 and a number average molecular weight of about 10,000 to 200,000. Specific example of the binder resin are vinyl chloride-vinyl acetate copolymers, vinyl chloride-vinyl acetate-vinyl alcohol copolymers, vinyl chloride-vinylidene chloride copolymers, vinyl chloride-acrylonitrile copolymers, methacrylate-acrylonitrile copolymers, polyurethane resins, nitrocellulose and the like.

A magnetic paint containing the magnetic powder and the binder resin may be prepared by a conventional method. For example, the magnetic powder and the binder resin are mixed with an organic solvent in which the binder resin is dissolved to form a paste. Then, a viscosity of the paste is adjusted by dilution with the organic solvent and treated in a suitable mixer such as a ball mill and a sand mill to prepare the magnetic paint. Examples of the organic solvent are methyl ethyl ketone, methyl isobutyl ketone, toluene, ethyl acetate, tetrahydrofuran, dioxane, cyclohexanone and mixtures thereof. The magnetic paint can be applied on a substrate such as a polyester or polyacetate film, by a conventional method, for example, with a coater.

The magnetic paint may contain conventionally used additives such as an organic dispersant, an electrically conductive filler, such as carbon black, a solid or liquid lubricant and the like.

Further, the magnetic paint may contain the conventional abrasives such as $Al_2O_3$, $SiO_2$, $TiO_2$, $Cr_2O_3$, $\alpha$-$Fe_2O_3$ and the like.

PREFERRED EMBODIMENTS

The present invention will be explained further in detail by following examples, in which parts are by weight unless otherwise indicated.

Table 1 shows the properties of the magnetic powder used in Examples and Comparative Examples.

Each magnetic powder was prepared as follows:

Magnetic powder No. 1

In a 1 N aqueous solution of sodium hydroxide (300 l), goethite powder (average major axis: 0.3 μm, average aspect ratio (average major axis/average minor axis): 14) (5 kg) was suspended, and a 0.5 M aqueous solution of $Al_2(SO_4)_3$ (15 l) was added. Then, carbon dioxide gas was bubbled in the mixture with thoroughly stirring to neutralize the mixture. After pH was reduced to less than 8, the powder was filtered, washed with water and well dried.

The surface treated goethite powder was reduced in a hydrogen stream at 500° C. for 4 hours to produce iron magnetic powder having a coating containing aluminum on the particle surface.

Magnetic powder No. 2

In a 1 N aqueous solution of sodium hydroxide (300 l), goethite powder (average major axis: 0.3 μm, average aspect ratio: 14) (5 kg) was suspended, and a 1 M aqueous solution of $Na_4SiO_4$ (11 l) was added. Then, carbon dioxide gas was bubbled in the mixture with thoroughly stirring to neutralize the mixture. After pH was reduced to less than 8, the powder was filtered, washed with water and well dried.

The surface treated goethite powder was reduced in a hydrogen stream at 500° C. for 4 hours to produce iron magnetic powder having a coating containing silicon on the particle surface.

Magnetic powder No. 3

In a 0.5 N aqueous solution of sodium hydroxide (300 ml), commercially available metal iron magnetic powder having $SiO_2$ coatings on particle surfaces (average major axis: 0.2 μm, Si content: 2% by weight based on the weight of iron) (5 g) was suspended, and a 0.5 M aqueous solution of $Al_2(SO_4)_3$ (13 ml) was added. Then, carbon dioxide gas was bubbled in the mixture with thoroughly stirring to neutralize the mixture. After pH was reduced to less than 8, the metal iron powder was recovered by filtration and washed with water followed by removal of water by a solvent replacing method and drying to produce the metal iron magnetic powder having an under coating containing silicon and an upper coating containing aluminum on the particle surface.

Magnetic powder Nos. 4, 9 and 14

In the same manner as in the production of Magnetic powder No. 3 but using commercially available metal iron magnetic powder having $SiO_2$ coatings on particle surfaces, an average particle size (major axis) and an aspect ratio as shown in Table 1 and changing the concentration and amount of the aqueous solution of $Al_2(SO_4)_3$ so as to adjust the weight ratio of aluminum to iron as shown in Table 1, metal iron magnetic powder having an under coating containing silicon and an upper coating containing aluminum on the particle surface was produced.

Magnetic powder No. 5

To a 1 N aqueous solution of sodium hydroxide (300 l), goethite powder (average major axis: 0.3 μm, average aspect ratio: 14) (5 kg) was suspended, and a 1 M aqueous solution of $Na_4SiO_4$ (5 l) was added. Then, carbon dioxide gas was bubbled in the mixture to neutralize the mixture to produce goethite powder having a coating of silica gel, which was then washed with water (?) and well dried. The dried goethite powder was hated at 400° C. for 2 hours to obtain hematite powder. Hematite powder (500 g) was suspended and well dispersed in a 0.5 N aqueous solution of sodium hydroxide (80 l) and then a 0.5 M aqueous solution of $Al_2(SO_4)_3$ (2 l) was added. Thereafter, carbon dioxide gas was bubbled in the mixture to neutralize the mixture to obtain hematite powder having a coating of aluminum hydroxide gel on a particle surface, which was washed with water and well dried. The produced hematite powder had a coating of $SiO_2$ on the particle surface and a coating of $Al_2O_3$ on the $SiO_2$ coating. The hematite powder was then heated and reduced in a hydrogen stream at 500° C. for 4 hours to produce metal iron magnetic powder having an under coating containing silicon and an upper coating containing aluminum on the particle surface.

Magnetic powder Nos. 7, 8, 10–13 and 15–19

In the same manner as in the production of Magnetic powder No. 5 but changing the concentrations and amounts of the aqueous solutions of $Al_2(SO_4)_3$ and $Na_4SiO_4$ so as to adjust the weight ratios of aluminum and silicon to iron as shown in Table 1, metal iron magnetic powder having an under coating containing silicon and an upper coating containing aluminum on the particle surface was produced.

Magnetic powder No. 20

In the same manner as in the production of Magnetic powder No. 19 but changing the sequence of the formations of the $SiO_2$ coating and the $Al_2O_3$ coating, metal iron magnetic powder having an under coating containing aluminum and an upper coating containing silicon on the particle surface was produced.

Magnetic powder No. 21

In a 1 N aqueous solution of sodium hydroxide (1 l), goethite powder (average major axis: 0.4 μm, average aspect ratio: 15) (24 g) was suspended, and $Al_2(SO_4)_3 \cdot 16H_2O$ (400 mg) and $Na_2SiO_4$ (10 g) were added. Then, carbon dioxide gas was bubbled in the mixture to reduce pH of the mixture to 6–8 so that $Al(OH)_3$ and silica gel were deposited on the surfaces of the goethite particles. The powder was filtered and dried at 70° C. for 5 hours.

The surface treated goethite powder (1 g) was reduced in a hydrogen stream at 320° C. for 4 hours to produce iron magnetic powder having a coating containing aluminum and silicon on the particle surface.

Magnetic powder No. 22

In a 2 N aqueous solution of sodium hydroxide (1 l), goethite powder (average major axis: 0.4 μm, average aspect ratio: 14) (24 g) was suspended, and $Al_2(SO_4)_3 \cdot 16H_2O$ (400 mg) was added. Then, carbon dioxide gas was bubbled in the mixture to reduce pH of the mixture to 6–8 so that $Al(OH)_3$ was deposited on the surfaces of the goethite particles. The powder was filtered and dried at 70° C. for 5 hours. The dried powder was mixed with and dispersed in a solution of a silicone oil (dimethylpolysiloxane. KF 96 manufactured by Shinetsu Chemical. 100 CS) (0.48 g) in methyl ethyl ketone (400 ml). After filtration, the powder was dried at 70° C. for 3 hours.

The surface treated goethite powder (1 g) was reduced in a hydrogen stream at 320° C. for 4 hours to produce iron magnetic powder having an under coating containing aluminum and an upper coating containing silicon on the particle surface.

magnetic powder as Magnetic powder No. 25 (20 g) was suspended, and a 1 M aqueous solution of $Na_4SiO_4$ (20 ml) and 0.5 M aqueous solution of $Al_2(SO_4)_3$ (35 ml) were added. Then, carbon dioxide gas was bubbled in the mixture with stirring to neutralize the mixture to form a coating comprising the silicon-containing compound and the aluminum-containing compound on the surface of the powder particles. The powder was filtered, washed with water and dried at 60° C. under reduced pressure to obtain barium ferrite having a coating containing aluminum and silicon on the particle surface.

TABLE 1

| Magnetic powder No. | Material | Coercive force (Oe) | Saturation magnetization (emu/g) | Average*1 particle size (μm) | Shape (ratio*2) | | Al/Fe (wt/wt) | Si/Fe (wt/wt) | Al/Si (wt/wt) |
|---|---|---|---|---|---|---|---|---|---|
| 1 | Metal iron | 1,450 | 125 | 0.2 | Acicular | (13) | 0.12 | — | — |
| 2 | ↑ | 1,455 | 129 | 0.2 | ↑ | (13) | — | 0.04 | — |
| 3 | ↑ | 1,470 | 128 | 0.2 | ↑ | (13) | 0.07 | 0.02 | 3.5 |
| 4 | ↑ | 1,465 | 125 | 0.2 | ↑ | (13) | 0.12 | 0.02 | 6.0 |
| 5 | ↑ | 1,470 | 122 | 0.2 | ↑ | (13) | 0.12 | 0.05 | 2.4 |
| 6 | ↑ | 1,440 | 123 | 0.2 | ↑ | (13) | 0.07 | 0.05 | 1.4 |
| 7 | ↑ | 1,480 | 117 | 0.2 | ↑ | (13) | 0.12 | 0.08 | 1.5 |
| 8 | ↑ | 1,470 | 121 | 0.2 | ↑ | (13) | 0.07 | 0.08 | 0.88 |
| 9 | ↑ | 1,490 | 124 | 0.2 | ↑ | (13) | 0.05 | 0.02 | 2.5 |
| 10 | ↑ | 1,480 | 121 | 0.2 | ↑ | (13) | 0.05 | 0.05 | 1.0 |
| 11 | ↑ | 1,450 | 118 | 0.2 | ↑ | (13) | 0.05 | 0.08 | 0.63 |
| 12 | ↑ | 1,440 | 115 | 0.2 | ↑ | (13) | 0.12 | 0.11 | 1.09 |
| 13 | ↑ | 1,455 | 121 | 0.2 | ↑ | (13) | 0.07 | 0.002 | 35.0 |
| 14 | ↑ | 1,400 | 129 | 0.2 | ↑ | (13) | 0.025 | 0.02 | 1.25 |
| 15 | ↑ | 1,490 | 124 | 0.2 | ↑ | (13) | 0.025 | 0.05 | 0.5 |
| 16 | ↑ | 1,050 | 127 | 0.1 | Granular | (1) | 0.07 | 0.02 | 3.5 |
| 17 | ↑ | 1,480 | 118 | 0.2 | Acicular | (13) | 0.01 | 0.05 | 0.2 |
| 18 | ↑ | 1,450 | 116 | 0.2 | ↑ | (13) | 0.13 | 0.01 | 13.0 |
| 19 | ↑ | 1,500 | 125 | 0.2 | ↑ | (13) | 0.07 | 0.02 | 3.5 |
| 20 | ↑ | 1,450 | 126 | 0.2 | ↑ | (13) | 0.07 | 0.02 | 3.5 |
| 21 | ↑ | 1,480 | 128 | 0.3 | ↑ | (13) | 0.001 | 0.05 | 0.02 |
| 22 | ↑ | 1,440 | 129 | 0.3 | ↑ | (13) | 0.001 | 0.007 | 0.14 |
| 23 | Co—γ—$Fe_2O_3$ | 750 | 78 | 0.3 | ↑ | (14) | — | — | — |
| 24 | ↑ | 750 | 76 | 0.3 | ↑ | (14) | 0.065 | 0.02 | 3.25 |
| 25 | Ba ferrite | 800 | 55 | 0.1 | Plate | (7) | — | — | — |
| 26 | ↑ | 800 | 52 | 0.1 | ↑ | (7) | 0.05 | 0.015 | 5.0 |

Note:
*1Average particle size: An average major axis for acicular and particle powder. An average diameter for plate powder.
*2Aspect ratio or plate ratio.

Magnetic powder No. 23

Commercially available untreated cobalt-containing γ-$Fe_2O_3$ magnetic powder (cobalt content: 2.5% by weight) was used.

Magnetic powder No. 24

In a 2 N aqueous solution of sodium hydroxide (1 l), the same cobalt-containing γ-$Fe_2O_3$ magnetic powder as Magnetic powder No 23 (24 g) was suspended, and a 1 M aqueous solution of $Na_4SiO_4$ (25 ml) and 0.5 M aqueous solution of $Al_2(SO_4)_3$ (40 ml) were added. Then, carbon dioxide gas was bubbled in the mixture with stirring to neutralize the mixture to form a coating comprising the silicon-containing compound and the aluminum-containing compound on the surface of the powder particles. The powder was filtered, washed with water and dried at 60° C. under reduced pressure to obtain γ-$Fe_2O_3$ magnetic powder having a coating containing aluminum and silicon on the particle surface.

Magnetic powder No. 25

Commercially available untreated hexagonal system plate-like barium ferrite magnetic powder was used.

Magnetic powder No. 26

To a 2 N aqueous solution of sodium hydroxide (1 l), the same hexagonal system plate-like barium ferrite Examples 1–19 and Comparative Examples 1–11

By using the magnetic powder shown in Table 1, a magnetic recording medium (magnetic tape) was produced according to one of the following production methods:

Production methods

Method No. 1

In a 3 liters steel-made ball mill, the magnetic powder (100 parts), a vinyl chloride-vinyl acetate-vinyl alcohol copolymer (VAGH, a trade name of Union Carbide Corp.) (10 parts), a polyurethane resin having an average molecular weight of 20,000 to 30,000 (Pandex T-5201, a trade name of Dainippon Ink) (6 parts), myristic acid (5 parts), carbon black (HS-500, a trade name of Asahi Denka) (1 part), toluene (85 parts) and methyl isobutyl ketone (85 parts) were charged and stirred for 72 hours to prepare a magnetic paste. With the magnetic paste, toluene (40 parts) and a polyisocyanate compound (Colonate L, a trade name of Takeda Chemical) (2 parts) were mixed to prepare a magnetic paint.

The magnetic paint was coated on a polyester film having a thickness of 12 μm so that the dried thickness of the coating was 4 μm and dried. The coated film was, then, planished and cut to a width of ½ inch to produce a magnetic tape.

Method No. 2

In the same manner as in Method No. 1 but additionally using n-butyl stearate (1 part), $\alpha$-$Al_2O_3$ powder (particle size: 0.4 $\mu$m. AKP-30, a trade name of Sumitomo Chemical) (5 parts) and liquid paraffin (1 part) for the preparation of a magnetic paste, a magnetic tape was produced.

Method No. 3

In the same manner as in Method No. 1 but additionally using $\alpha$-$Fe_2O_3$ powder (particle size: 0.01 $\mu$m. R-1107, a trade name of Titan Industries) (3 parts) for the preparation of a magnetic paste, a magnetic tape was produced.

Condition No. 4

In the same manner as in Condition No. 1 but additionally using $SiO_2$ powder (particle size: 0.01 $\mu$m. Aerosil 200, a trade name of Nippon Aerosil) (5 parts) for the preparation of a magnetic paste, a magnetic tape was produced.

Properties of the produced magnetic tape were measured as follows. The results are shown in Table 2 together with the number of the used magnetic powder.

RF output

After recording signals of 5 MHz at a constant level, output during reproducing was measured and the result is shown in Table 2 in terms of a comparative value with the output of the tape of Comparative Example 2 being 0 (zero). In Examples 18 and 19 and Comparative Examples 10 and 11, since the kinds of the magnetic powder were different from that used in other Examples and Comparative Examples, comparative values with Comparative Example 10 or 11 were also shown in brackets.

Durability

By using a commercially available VTR device, measured was a time period till the output decreased by 3 dB when a still image was reproduced at $-5°$ C.

Surface smoothness

By using a tracer type surface roughness tester, surface roughness (C.L.A., center line average) of the magnetic tape was measured at a tracer speed of 0.06 cm/sec. with cut off of 0.08 mm. The result is shown in terms of a relative value calculated according to the following equation with using the tape of Comparative Example 2 as a standard:

$$\text{Relative value} = 10 \log \frac{C.L.A. \text{ of the tape of Comp. Ex. 2}}{C.L.A. \text{ of each tape}}$$

Jitter

Jitter was expressed by the maximum value of fluctuation of distance in horizontal synchronizing signals of image signals reproduced by a VTR device, which was measured by a jitter meter (MK-611 A manufactured by Meguro Denpa Co., Ltd.).

Erasing characteristic

By using a commercially available VTR device, signals of 1 KHz was recorded in a sound track at a constant level. After erasing those signals, residual output of the recorded signals was measured and evaluated according to the following equation:

$$\text{Erasing characteristic} = 20 \log \frac{\text{Recording output}}{\text{Residual output of each tape}} -$$

$$20 \log \frac{\text{Recording output}}{\text{Residual output of the tape of Comp. Ex. 2}}$$

TABLE 2

| Example No. | Magnetic powder No. | Method No. | RF output (dB) | Durability (min.) | Surface smoothness | Jitter ($\mu$s) | Erase (dB) |
|---|---|---|---|---|---|---|---|
| 1 | 3 | 1 | 4.5 | 68 | 7.7 | 0.06 | 4.5 |
| 2 | 4 | 1 | 4.8 | 70 | 7.7 | 0.07 | 4.8 |
| 3 | 5 | 1 | 4.5 | 72 | 7.5 | 0.06 | 4.1 |
| 4 | 6 | 1 | 3.8 | 65 | 6.8 | 0.06 | 4.9 |
| 5 | 7 | 1 | 3.5 | 62 | 5.8 | 0.06 | 4.2 |
| 6 | 8 | 1 | 3.6 | 60 | 4.5 | 0.07 | 2.7 |
| 7 | 9 | 1 | 4.2 | 57 | 4.3 | 0.06 | 3.1 |
| 8 | 10 | 1 | 3.6 | 56 | 3.8 | 0.06 | 3.3 |
| 9 | 11 | 1 | 2.9 | 56 | 3.6 | 0.07 | 3.0 |
| 10 | 12 | 1 | 2.8 | 59 | 3.6 | 0.07 | 2.9 |
| 11 | 16 | 1 | 4.8 | 40 | 1.5 | 0.09 | 3.2 |
| 12 | 19 | 1 | 4.6 | 75 | 7.7 | 0.07 | 4.6 |
| 13 | 20 | 1 | 4.3 | 60 | 7.5 | 0.06 | 4.5 |
| 14 | 1,2 (50:50) | 1 | 4.9 | 68 | 7.9 | 0.08 | 6.2 |
| 15 | 1,17 (50:50) | 1 | 4.3 | 65 | 8.4 | 0.07 | 7.3 |
| 16 | 2,8 (40:60) | 1 | 4.4 | 70 | 8.2 | 0.08 | 6.8 |
| 17 | 3 | 3 | 4.8 | 72 | 7.9 | 0.08 | 6.9 |
| Comp. 1 | 1 | 1 | 0.1 | 35 | 0.1 | 0.12 | −0.1 |
| Comp. 2 | 2 | 1 | 0 | 15 | 0 | 0.21 | 0 |
| Comp. 3 | 13 | 1 | 1.2 | 55 | 0.2 | 0.10 | 2.9 |
| Comp. 4 | 14 | 1 | 2.7 | 21 | −0.0 | 0.15 | 2.5 |
| Comp. 5 | 15 | 1 | 1.3 | 15 | 1.0 | 0.13 | 2.7 |
| Comp. 6 | 21 | 1 | 0.1 | 10 | 0 | 0.13 | 0.1 |
| Comp. 7 | 22 | 1 | 0.5 | 9 | 0.1 | 0.12 | 1.9 |
| Comp. 8 | 1 | 4 | −0.2 | 68 | −1.2 | 0.18 | 1.9 |
| Comp. 9 | 2 | 2 | −0.1 | 16 | −0.8 | 0.18 | 1.5 |
| 18 | 24 | 1 | 3.9 (3.1) | 67 | 8.2 | 0.09 | 5.1 |
| Comp. 10 | 23 | 1 | 0.8 (0) | 18 | −0.1 | 0.17 | 1.7 |
| 19 | 26 | 1 | 3.7 (2.6) | 72 | 7.9 | 0.10 | 4.9 |
| Comp. 11 | 25 | 1 | 1.1 (0) | 9 | 0.3 | 0.18 | 1.7 |

As is clear from the results of Table 2, the magnetic tapes of the present invention (Examples 1-19) have much better output characteristics such as RF output and durability than the magnetic tapes of Comparative Examples.

Particularly, the magnetic tapes utilizing the magnetic powder having the coating containing both aluminum and silicon (Examples 1-10, etc.) are excellent in jitter. The magnetic tapes utilizing a mixture of the magnetic powder having the coating containing aluminum and the magnetic powder having the coating containing silicon (Examples 14-16) have particularly good erasing characteristics.

When the Al/Si ratio is in the range between 2 and 15 and the powder particles are of acicular shape (Examples 1-3, 7, 12 and 13), the magnetic tapes have superior RF output to those of Examples 4-6 and 8-10, and further superior durability and surface smoothness to that of Example 11.

The combination of the magnetic powder particles of which are covered with the silicon-containing compound and $Al_2O_3$ particles (Comparative Example 9) or the combination of the magnetic powder particles of which are covered with the aluminum-containing compound and the $SiO_2$ particles (Comparative Example 8) could not provide a magnetic tape having satisfactory output characteristics.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium comprising a substrate and a magnetic layer formed on said substrate, said magnetic layer including iron-containing magnetic powder dispersed in a binder, said powder comprising particles the surfaces of which are covered with both a compound containing aluminum and a compound containing silicon in such amounts that a weight ratio of silicon to iron is from 0.010:1 to 0.090:1, a weight ratio of aluminum to iron is from 0.060:1 to 0.130:1 and a weight ratio of aluminum to silicon is from 2:1 to 15:1.

2. The magnetic recording medium according to claim 1, wherein the magnetic powder is contained in the magnetic layer in a volume of not less than 15% by volume.

3. The magnetic recording medium according to claim 1, wherein the magnetic powder consists of particles having an easily oriented shape.

4. The magnetic recording medium according to claim 1, wherein the magnetic powder is a metal iron magnetic powder.

5. The magnetic recording medium according to claim 1, wherein said recording medium has a surface roughness of 0.01 μm in terms of center line average height.

6. The magnetic recording medium according to claim 1, wherein aluminum is present in the form of aluminum oxide or water-containing aluminum oxide.

7. The magnetic recording medium according to claim 1, wherein the magnetic powder consists of magnetic powder particles each having an under coating of a silicon-containing compound and an upper coating of a aluminum-containing compound on said under coating.

8. The magnetic recording medium according to claim 7, wherein the under coating consists of silicon oxide or water-containing silicon oxide, and the upper coating consists of aluminum oxide or water-containing aluminum oxide.

* * * * *